US008699831B2

(12) United States Patent
Thylen et al.

(10) Patent No.: US 8,699,831 B2
(45) Date of Patent: Apr. 15, 2014

(54) PROCESS POLING FOR MATERIAL CONFIGURATION

(75) Inventors: Lars Helge Thylen, Huddinge (SE); Michael Renne Ty Tan, Menlo Park, CA (US); Shih-Yuan Wang, Palo Alto, CA (US); Alexandre M Bratkovski, Mountain View, CA (US); Wayne V Sorin, Mountain View, CA (US); Michael Josef Stuke, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 256 days.

(21) Appl. No.: 13/284,164

(22) Filed: Oct. 28, 2011

(65) Prior Publication Data

US 2013/0108207 A1    May 2, 2013

(51) Int. Cl.
*G02B 6/12*    (2006.01)
(52) U.S. Cl.
USPC .......................................................... 385/14
(58) Field of Classification Search
None
See application file for complete search history.

(56) References Cited

U.S. PATENT DOCUMENTS

| 7,569,503 | B2* | 8/2009 | Pan et al. ...................... 438/795 |
| 7,919,755 | B2 | 4/2011 | Rahman et al. |
| 7,970,244 | B2* | 6/2011 | Krug et al. ...................... 385/32 |
| 2010/0040322 | A1* | 2/2010 | Li et al. ............................. 385/3 |
| 2010/0187402 | A1* | 7/2010 | Hochberg et al. .......... 250/208.1 |
| 2010/0187442 | A1 | 7/2010 | Hochberg et al. |
| 2011/0069969 | A1* | 3/2011 | Hochberg et al. ............. 398/141 |

OTHER PUBLICATIONS

Hu, H. et al, Towards Nonlinear Photonic Wires in Lithium Niobate, (Research Paper), Proc. of SPIE on Integrated Optics: Devices, Materials, and Technologies XIV, Feb. 2010.
Jin, D. et al., EO Polymer Modulators Reliability Study, Proc. SPIE 7599 Research Paper, (Jan. 2010).
Scheerlinck, S. et al., Flexible Metal Grating Based Optical Fiber Probe for Photonic Integrated Circuits, (Research Paper), Applied Physics Letters, Jan. 23, 2008, vol. 92, 3 pages.

* cited by examiner

Primary Examiner — Sung Pak

(57) ABSTRACT

A method includes fabricating a circuit element and a connection to the circuit element for a photonic integrated circuit. The method includes associating a configurable material with the circuit element and activating the configurable material via a poling rail and the connection to the circuit element during production of the integrated circuit.

19 Claims, 4 Drawing Sheets

PROCESS POLING FOR MATERIAL CONFIGURATION

BACKGROUND

Photonic integrated circuit (PIC) production processes typically include fabricating circuit elements such as modulators, switches, filters and so forth onto silicon and/or III V material wafers. These elements are connected during the process to form larger circuits such as switch arrays, modulator banks, optical add drop multiplexers, and so forth. Although complex chemical processes are involved in fabrication, often similar materials are typically employed when fabricating the wafers. These materials can include semiconductor materials such as silicon as a platform and for optical waveguide formation, III-V materials but also different types of electro-optical polymers or ferroelectric materials.

DETAILED DESCRIPTION

Figure 1:
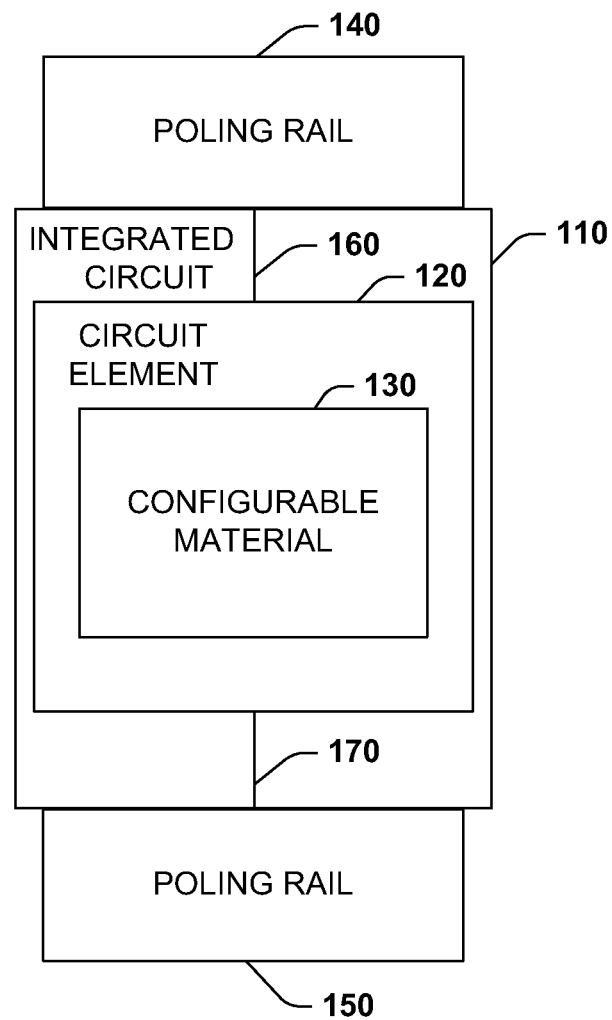
FIG. 1 illustrates an example of an integrated circuit that utilizes a poling rail for material configuration of photonic integrated circuits during production.

FIG. 1 illustrates an example of an integrated circuit 110 that utilizes a poling rail for material configuration of photonic integrated circuits during production. The integrated circuit 110 can include a circuit element 120, such as an optical switch or optical wave guide, for example. The circuit element 120 can include a configurable material 130 that generally requires some form of external stimulation to activate the material, which external stimulation can be provided during the production process of the integrated circuit 110. In one example, the configurable material 130 could be an electro-optic material that is employed with other elements, such as silicon, to form the underlying circuit element 120. When the configurable material 130 is initially deposited on to the silicon in the circuit element 120, its electro-chemical properties may be such that its associated dipoles are arranged randomly and thus not yet functional to support the circuit element 120. As shown, one or more poling rails at 140 and 150 may be provided to activate the configurable material 130 during fabrication (e.g., before integrated circuit chip packaging). If the configurable material 130 were a polymer, for example, the poling rails 140 and 150 could supply an electric field to align the dipoles of the polymer in the same direction and thus activate the polymer to perform its respective circuit function in the circuit element 120. Thus, activation places the configurable material 130 into a state of permanence (or semi-permanence) such that the configurable material remains in the state following fabrication of the integrated circuit.

After the configurable material 130 has been activated in response to the electric field provided by the poling rails 140 and 150, the poling rails can be removed during fabrications, such as in a subsequent etching process (e.g., wet etching, plasma etching, or the like). It is noted that activation as used herein can include substantially any type of integrated circuit fabrication process where poling rails 140 and 150 provide some form of permanent or semi-permanent configuration to the circuit elements 120 within the integrated circuit 110. For example, the poling rails 140 and 150 could provide an electrical voltage activation, electrical current activation, electromagnetic activation, or thermal activation such as establishing a thermal gradient between the rails (e.g., applying a heated probe to the poling rail). The configurable material 130 can include substantially any material that requires configuration during fabrication of the underlying integrated circuit wafer (e.g., before wafer has been separated into individual chips that are subsequently packaged) and is activated via the poling rails 140 or 150.

In general, each circuit element 120 can be connected to the poling rails 140 and 150 via circuit connections 160 and 170. Thus, the circuit connections 160 and 170 can serve a dual purpose. For example, during production of the integrated circuit 110, such connections can be employed with the poling rails 140 and 150 to activate the configurable material 130. After the configurable material 130 has been activated and the poling rails 140 and 150 have been removed, the circuit connections 160 and 170 can further be employed for desired circuit operations of the circuit element 120 and integrated circuit 110. The circuit connections 160 and 170 can be connected to integrated circuit pins for electrical connections to external components and/or can be connected to other connections within the integrated circuit 110, for example.

Although two poling rails 140 and 150 can be employed to configure a plurality of circuit elements 120 in parallel and as part of an efficient, batch production process, in other examples, a single rail could be utilized or more than two poling rails could be used for a larger circuit structure. For example, if a common connection were employed between a plurality of circuit elements 120, such common connection could be utilized in conjunction with a single poling rail (e.g., 140 or 150) to provide a path for activation to the configurable material 130.

As a further example, the integrated circuit 110 can be produced according to a method for fabricating a circuit element 120 and a connection 160 and 170 to the circuit element for the integrated circuit. This process can include associating a configurable material 130 with the circuit element 120 and activating the configurable material via a poling rail 140 or 150 and connection to the circuit element during production of the integrated circuit 110. As noted previously, the poling rail 140 or 150 can be removed after the configurable material 130 is activated. The poling rails 140 and 150 can be a metallic material or a doped semiconductor material, for example.

In the example of polymer as the configurable material 130, an electric field can be applied via the poling rails 140 and 150 and via the connections 160 and 170 to the circuit element 120 to activate the configurable material. This can include applying the electric field at an elevated temperature (e.g., greater than 100 deg C.) to activate the configurable material, which is subsequently cooled. After the polymer has been activated, it may be employed in an underlying circuit element function. This function can vary depending on the configuration of the circuit element, including the configurable material. In one example, the circuit element can be a photonic circuit (e.g., an optical waveguide, modulator, switch or the like), such that the structure comprising the configurable material can control its optical properties, such as its index of refraction or absorption properties. By configuring the material 130 in this way, the corresponding functionality of the circuit elements (e.g., switches, waveguides, gates, modulators, and/or filters) can be selectively enabled for corresponding operation, for example. In order that the poling rails 140 and 150 can be utilized for parallel activation processes of multiple circuit elements 120, path lengths for the connections 160 and 170 may have to be adjusted to the circuit element in order to accommodate a parallel connection. For instance, the path length connections for one circuit element may be longer or shorter than another circuit element to accommodate a parallel connection to the polling rails for multiple circuit elements.

Use of the poling rails 140 and 150 can facilitate batch and hence low cost processing of integrated circuit wafers that may need to have a plurality of circuit elements configured in some manner during fabrication. For example, such wafers can include silicon-based photonics integrated circuits (PICs), where silicon technology can be augmented in functionality by adding configurable materials, such as electro-optic polymers or other active materials (e.g., III-Vs, chalcogenides). These materials enable fabrication of circuit elements including efficient modulators, switches, and tunable filters on a silicon platform, for example. Thus, manufacturers do not have to configure individual devices or chips, but rather can pole the electro-optic polymer over an entire wafer, if desired, to facilitate efficient parallel configuration. Therefore, irrespective of the layout of the individual chip electronic control lead network on the wafer, manufacturing operations can still utilize the same circuit connections 160 and 170 for poling, given that they are connected to poling rails 140 and 150 such that in situ poling can occur in one process step. After etching away the poling rails 140 and 150, the wafer can be sectioned into chips for subsequent integrated circuit packaging.

For purposes of simplification of explanation, in the present example, different components of the system 100 are illustrated and described as performing different functions. However, one of ordinary skill in the art will understand and appreciate that the functions of the described components can be performed by different components, and the functionality of several components can be combined and executed on a single component.

Figure 2:
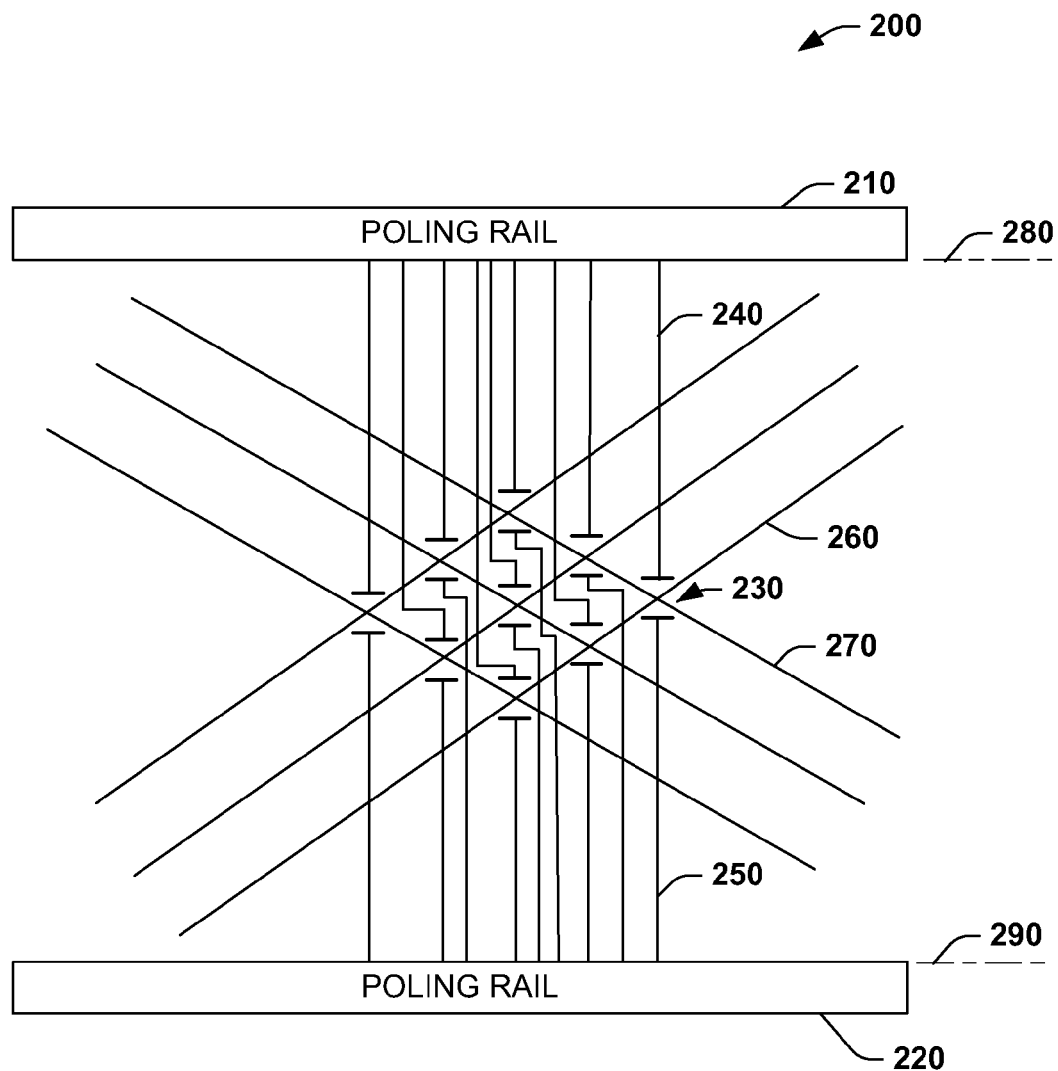
FIG. 2 illustrates an example of an integrated circuit that employs polling rails to configure polymer circuit elements within the circuit.

FIG. 2 illustrates an example of a photonic integrated circuit 200 that employs polling rails 210 and 220 to configure polymer circuit elements within the circuit. The example circuit 200 illustrates the shape of a crossbar switch and the general concept of utilizing poling rails 210 and 220 to apply poling voltages. As can be appreciated, the topology illustrated for the circuit 200 can be different for different device structures; however, principles for configuration by poling can be implemented similarly. As shown, the example circuit 200 includes various circuit elements, such as a control element 230 having electrodes that are respectively connected to the poling rails 210 and 220 via circuit connections 240 and 250. For purposes of brevity, each control element in the circuit 200 will not be described but principles for configuration by poling can be similar. The control element 230 could be a switch that has polymer deposited between the electrodes of the control element, for example. The polymer could be utilized to control the index of refraction for light waves, for example, where the control elements such as element 230 operate optical waveguides such as shown at 260 and 270. Thus, when voltage is applied to the electrodes of the control element 230 during normal circuit operation, light is routed through, altered, or blocked depending on the applied voltage to the respective electrodes.

During production processes however, the circuit connections 240 and 250 can be attached to the poling rails 210 and 220. During this phase, voltage can be applied via the poling rails 210 and 220, wherein polymer or other material within the control elements such as control element 230 is activated.

In this example, a poling voltage can be applied to the electrodes via the poling rails 210 and 220. Such poling voltage can be applied to configure the polymer by orienting dipoles in the polymer in a similar direction and thus enabling desired optical properties such as the ability to control the index of refraction for light waves. After the activation process of the polymer, the poling rails 210 and 220 can be removed via an etching process. The circuit connections 240 and 250, which are initially employed for poling, can now be utilized for circuit operations of the integrated circuit 200 and can be connected to pins (not shown) for external connections that apply signals to operate the control elements. It is noted that application of poling can generally influence the manner in which the control wiring or lead arrangement in the integrated circuit 200 can be implemented, since the wiring should be compatible with poling as well as switch control (e.g., wiring arranged to allow parallel poling of multiple control elements).

It may not always be possible to apply the shortest route to the chip edge for the chip connections 240 and 250. For example, the connections 240 and 250 extend from each of a plurality of circuit elements 230 and terminate in a respective termination point (e.g., temporary termination point to make parallel connection to poling rail 210 or 220). However, at least some of the connections 240 or 250 can follow something different from a direct linear path (e.g., with lateral or zigzag extending portions) to couple to the poling rails 210 or 220. Since the connections 240 and 250 are designed to couple to respective poling rails, each of the termination points for a given poling rail can be aligned along a substantially linear path that remains even after the poling rails are removed. This substantially linear path is demonstrated schematically at 280 for poling rail 210 and at 290 for poling rail 220 and is substantially transverse to the direction that the connections extend.

Some of the electro-optic qualities of polymers will now be described but as noted above, the poling concepts described herein can be applied to substantially any type of material that requires configuration during production of the integrated circuit 200. Electro-optic polymers, for example polymers exhibiting Pockels linear electro-optic effect, provide one category of materials offering large refractive index changes in relation to other technology such as lithiumniobate. A figure of merit for such materials is the electro-optic coefficient (or $r_{33}$-coefficient) being around 30 pm/V for lithium niobate and up to 500 pm/V for electro-optic polymers. With concomitant achievable index changes, such as larger than 0.1, this can lead to a decrease in the figure of merit voltage times length (V×L) product by orders of magnitude in relation to prevalent lithium niobate technology. In addition, since power scales as the voltage squared, there are possibilities to reduce power dissipation associated with charging and discharging capacitor electrodes such as controlling a modulator or switch as shown at 230. However, these materials generally require in situ poling, to transform them from inversion symmetry (r=0) to asymmetry and thus gaining the linear electro-optic effect.

Figure 3:
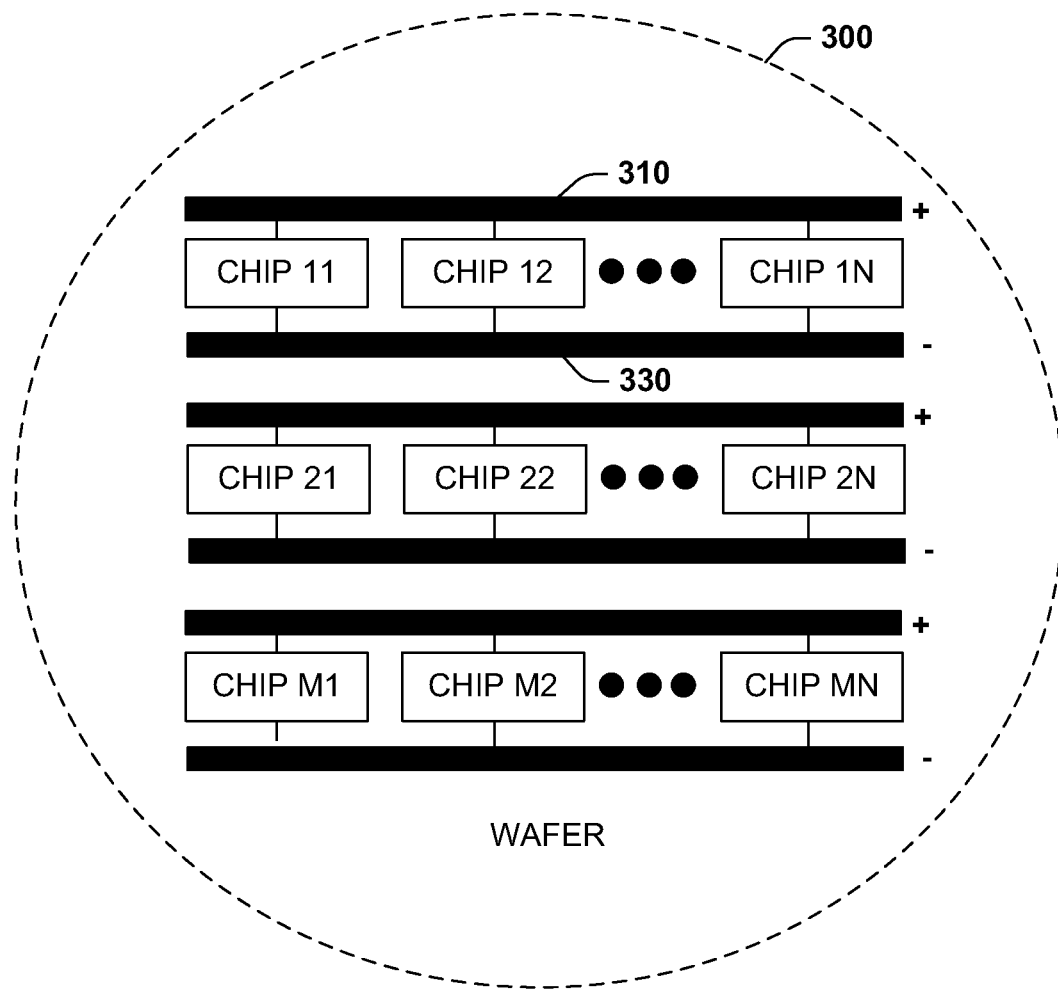
FIG. 3 illustrates an example integrated circuit wafer that employs poling rails for material configuration during production.

Poling generally can occur at elevated temperatures, such as greater than 100 degrees C. (e.g., several hundred degrees C.), for example, using an electric field applied over the polymer via the poling rails 210 and 220. To enable low cost batch processing for each wafer containing many chips, it is thus desirable to use basically the same electrode pattern for poling as that used for controlling the photonic switch fabric and in general the on chip network. Such arrangement can be realized by connecting the intra-chip control electronic lead network (e.g., connections 240 and 250) to poling rails 210 and 220, such as at least two for each chip, connected in series for each row, and in parallel between rows as illustrated in FIG. 3. The polymer material can then be poled over the entire wafer in one step, and in subsequent process steps, the poling rails 210 and 220 can be etched away and the wafer further processed.

FIG. 3 illustrates an example integrated circuit wafer 300 that employs poling rails for material configuration during production. As shown, the wafer 300 includes a plurality of chips (e.g., integrated circuits) that can be arranged in a plurality of rows, wherein there are N chips per row and M rows of chips, for example, with N and M being positive integers. As shown, a poling rail 310 and 330 can be provided for the first row of chips and can be employed during production to activate configurable material within the chips. Other rows of chips can include associated poling rails respectively although they are not described herein for purposes of brevity. Each chip can be connected to the respective poling rails via circuit connections that are utilized during normal circuit operations of the chip. Thus, the circuit connections can provide a dual role, where they are employed for configuration in conjunction with the poling rails during production and then later utilized for circuit operations after the poling rails have been removed.

Figure 4:
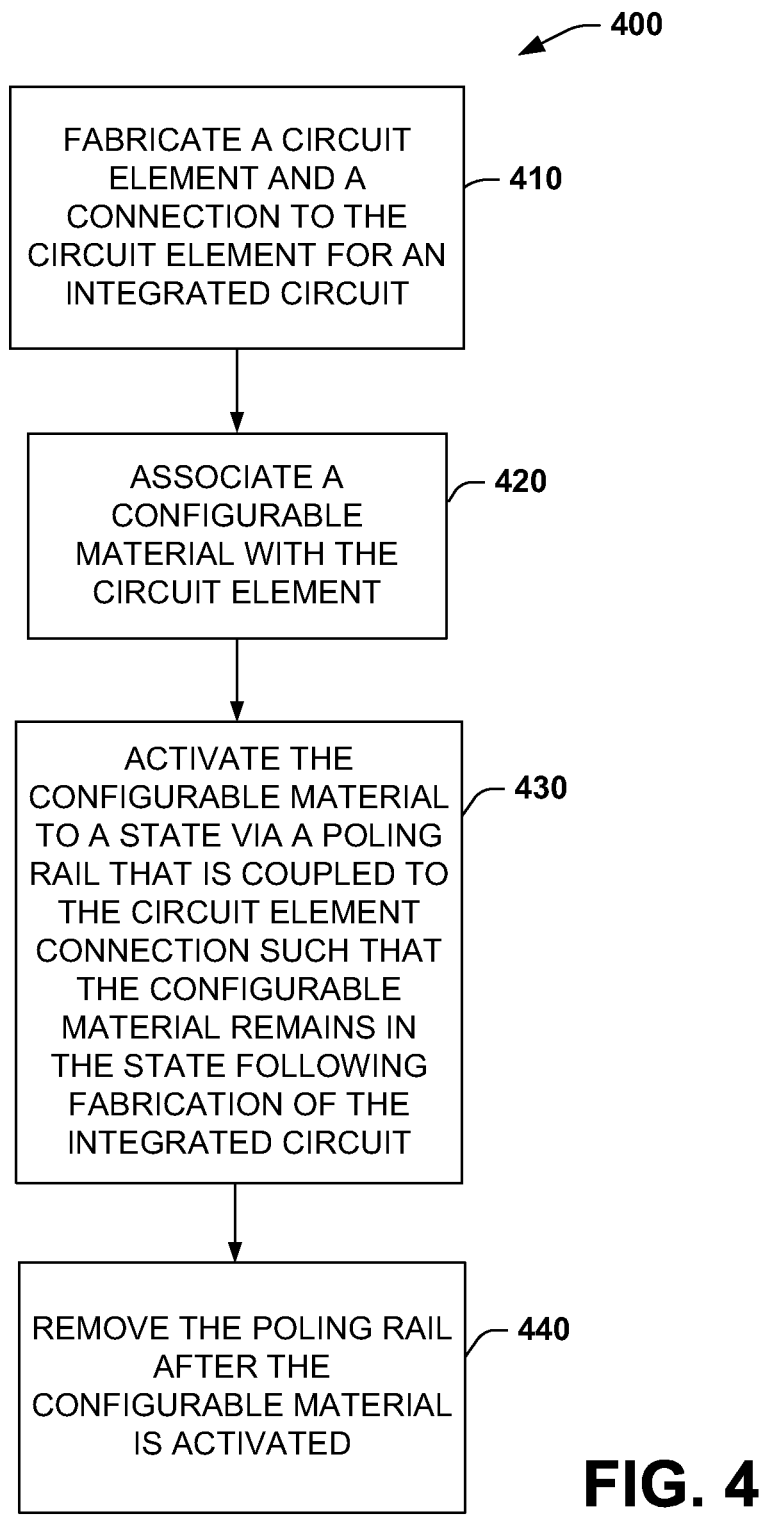
FIG. 4 illustrates an example method for process poling for material configuration in photonic integrated circuits.

In view of the foregoing structural and functional features described above, an example method will be better appreciated with reference to FIG. 4. While, for purposes of simplicity of explanation, the method is shown and described as executing serially, it is to be understood and appreciated that the method is not limited by the illustrated order, as parts of the method could occur in different orders and/or concurrently from that shown and described herein.

FIG. 4 illustrates an example method 400 for process poling for material configuration. The method 400 includes fabricating a circuit element (e.g., element 120 of FIG. 1) and a connection to the circuit element for an integrated circuit (e.g., integrated circuit 110 of FIG. 1) at 400. The method 400 includes associating a configurable material with the circuit element at 420 (e.g., configurable material 130 of FIG. 1). As noted previously, such configurable material can include a material having a high electro-optic effect, such as having an electro-optic coefficient $r_{33}$ greater than 300 pm/V. For example, the material in the configurable material can be implemented as a chalcogenide, a high-electro-optic coefficient $r_{33}$ polymer, or a variety of other materials, for example. The method 400 includes activating the configurable material via a poling rail (e.g., poling rail 140 of FIG. 1) and the connection to the circuit element during production of the integrated circuit at 430. For example, activation can include applying an electric field to electrodes that cause a polymer material to be configured (e.g., dipoles in the material to be similarly aligned). At 440 of the method 400, the poling rails can be removed after the configurable material has been activated.

By way of further example the method 400 can also include fabricating the poling rail as a metallic material or as a doped semiconductor material, for example. This can include applying an electric field via the poling rail and the connection to the circuit element to activate the configurable material. The electric field can be applied at an elevated temperature to activate the configurable material. This can include a current, magnetic field, or a thermal gradient via the poling rail to activate the configurable material. If a polymer is employed as the configurable material, the underlying circuit element can be employed for controlling an index of refraction via the polymer after activation has occurred. The circuit element can be a switch, an optical waveguide, an optical gate, an optical modulator, or an optical filter, for example.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method, comprising:
    fabricating multiple circuit elements for a photonic integrated circuit;
    fabricating a polling rail to configure the photonic integrated circuit;
    fabricating separate connections from the poling rail to each of the multiple circuit elements, wherein each of the separate connections enables circuit operations for each of the multiple circuit elements after fabrication of the photonic integrated circuit;
    associating a configurable material with each of the multiple circuit elements; and
    concurrently activating the configurable material associated with each of the multiple circuit elements to a state via the poling rail that is coupled to the separate connections and to each of the multiple circuit elements such that the configurable material remains in the state following fabrication of the photonic integrated circuit.

2. The method of claim 1, further comprising removing the poling rail after the configurable material is activated and connecting each of the separate connections to separate pins to enable external signal connections to control each of the multiple circuit elements for the photonic integrated circuit.

3. The method of claim 1, further comprising fabricating the poling rail as a metallic material or as a doped semiconductor material.

4. The method of claim 1, further comprising energizing the poling rail to apply an electric field to the circuit element to activate the configurable material to the state.

5. The method of claim 4, further comprising applying the electric field at a temperature above one hundred degrees Celsius to activate the configurable material.

6. The method of claim 1, wherein activating the configurable material further comprises applying a current or a thermal gradient via the poling rail to activate the configurable material.

7. The method of claim 1, wherein the configurable material comprises an electro-optic material deposited on to the circuit element.

8. The method of claim 7, wherein the configurable material comprises a polymer.

9. The method of claim 1, wherein the circuit element comprises a switch, an optical waveguide, a gate, a modulator, or a filter.

10. The method of claim 1, further comprising altering a path length for at least one of the separate connections to the multiple circuit elements to facilitate parallel connections for the multiple circuit elements to the poling rail.

11. A photonic integrated circuit chip that is produced according to the method of claim 10, wherein at least some of the parallel connections in the integrated circuit have different lengths.

12. A method, comprising:
fabricating multiple circuit elements on a photonic integrated circuit;
fabricating an electro-optic material as a portion of each of the multiple circuit elements;
fabricating multiple poling rails to enable configuration of each of the multiple circuit elements;
fabricating separate connections to extend between each of the multiple polling rails and each of the multiple circuit elements;
applying a voltage to the multiple poling rails to configure the electro-optic material in each of the multiple circuit elements concurrently; and
removing the multiple poling rails after the electro-optic material has been configured.

13. A photonic integrated circuit, comprising:
a plurality of circuit elements that employ an electro-optic material to perform a circuit function; and
a connection extending from each of the plurality of circuit elements and terminating in a respective termination point corresponding to a location of a poling rail that has been removed from the photonic integrated circuit, each of the termination points being aligned along a substantially linear path corresponding to the location of the poling rail, wherein the connection extending from each of the plurality of circuit elements enables concurrent configuration of each of the plurality of circuit elements during fabrication of the photonic integrated circuit and enables circuit operation of a respective circuit element of the plurality of circuit elements after the poling rail has been removed.

14. The photonic integrated circuit of claim 13, wherein the electro-optic material is a polymer.

15. The photonic integrated circuit of claim 13, wherein the circuit function is a switch, a waveguide, a gate, a modulator, or a filter.

16. The photonic integrated circuit of claim 13, further comprising a separate pin connected to each connection extending from each of the plurality of circuit elements to enable external signal connections to control the photonic integrated circuit.

17. The photonic integrated circuit of claim 13, wherein the electro-optic material to perform the circuit function is configured with at least one other electro-optic material to enable an optical switching circuit.

18. The photonic integrated circuit of claim 17, wherein the optical switching circuit is an optical crossbar switch.

19. The photonic integrated circuit of claim 13, wherein the plurality of circuit elements are distributed across an integrated circuit wafer as a plurality of integrated circuits aligned along a substantially linear path corresponding to the location of the poling rail.

* * * * *